(12) United States Patent
Zhang et al.

(10) Patent No.: US 11,418,261 B2
(45) Date of Patent: Aug. 16, 2022

(54) DATA TRANSMISSION METHOD AND DEVICE

(71) Applicant: ZTE CORPORATION, Guangdong (CN)

(72) Inventors: Weiliang Zhang, Guangdong (CN); Yong Guo, Guangdong (CN); Xingang Huang, Guangdong (CN); Dan Geng, Guangdong (CN)

(73) Assignee: ZTE CORPORATION

( * ) Notice: Subject to any disclaimer, the term of this patent is extended or adjusted under 35 U.S.C. 154(b) by 22 days.

(21) Appl. No.: 16/491,658

(22) PCT Filed: Sep. 5, 2017

(86) PCT No.: PCT/CN2017/100567
§ 371 (c)(1),
(2) Date: Jan. 21, 2020

(87) PCT Pub. No.: WO2018/161510
PCT Pub. Date: Sep. 13, 2018

(65) Prior Publication Data
US 2020/0204261 A1    Jun. 25, 2020

(30) Foreign Application Priority Data
Mar. 6, 2017 (CN) .......................... 201710129334.2

(51) Int. Cl.
*H04B 10/27* (2013.01)
*H04B 10/25* (2013.01)
*H04Q 11/00* (2006.01)

(52) U.S. Cl.
CPC ......... *H04B 10/27* (2013.01); *H04B 10/2589* (2020.05); *H04Q 11/0067* (2013.01); *H04Q 2011/0064* (2013.01)

(58) Field of Classification Search
CPC H04B 10/27; H04B 10/2589; H04Q 11/0067; H04Q 11/00; H04Q 2011/0073; H04Q 2011/0086; H04Q 2011/0064
(Continued)

(56) References Cited

U.S. PATENT DOCUMENTS

| 2005/0047783 A1* | 3/2005 | Sisto | H04L 47/808 398/71 |
| 2005/0100036 A1* | 5/2005 | Davis | H04Q 11/0067 370/395.3 |

(Continued)

FOREIGN PATENT DOCUMENTS

| CN | 102821029 A | 12/2012 |
| CN | 105164978 A | 12/2015 |

(Continued)

OTHER PUBLICATIONS

Yang et al, Multiple LLIDs per ONU An Optimal Solution for Delivering Multiple Services, Dec. 2005, SPIE, All Document. (Year: 2005).*

(Continued)

*Primary Examiner* — Dibson J Sanchez
(74) *Attorney, Agent, or Firm* — McDonald Hopkins LLC (57) ABSTRACT

A data transmission method includes steps described below. An optical line terminal (OLT) divides logical links supported by an optical network unit (ONU) into one or more logical link groups; and the OLT allocates a bandwidth to the logical link group of the ONU, so one or more logical links in the logical link group of the ONU share the bandwidth to transmit data.

18 Claims, 3 Drawing Sheets

Divide, by an OLT, Logical links supported by an ONU into at least one logical link group — S102

Allocate, by the OLT, a bandwidth to each of the at least one logical link group of the ONU, so that one or more logical links within the logical link group of the ONU share the bandwidth to transmit data — S104

(58) Field of Classification Search
USPC .................................................. 398/43–103
See application file for complete search history.

(56) References Cited

U.S. PATENT DOCUMENTS

| | | | | |
|---|---|---|---|---|
| 2005/0129030 A1* | 6/2005 | Choi | ................... | H04L 41/145 370/395.53 |
| 2007/0025734 A1* | 2/2007 | Oogushi | ................ | H04J 14/02 398/71 |
| 2007/0248109 A1* | 10/2007 | DeCarolis | ............ | H04J 3/1694 370/412 |
| 2009/0208204 A1* | 8/2009 | Zhang | ................ | H04L 12/2872 398/25 |
| 2010/0074628 A1* | 3/2010 | Murakami | .......... | H04L 12/2885 398/182 |
| 2011/0142442 A1* | 6/2011 | Hirth | ................. | H04Q 11/0067 398/25 |
| 2012/0093500 A1* | 4/2012 | Shiba | ................. | H04J 14/0246 370/293 |
| 2013/0129354 A1* | 5/2013 | Tanaka | ............... | H04L 43/0811 398/66 |
| 2013/0236170 A1* | 9/2013 | Nishitani | ............ | H04L 12/2865 398/25 |
| 2013/0315596 A1* | 11/2013 | Rollet | ................ | H04L 12/4035 398/67 |
| 2014/0133855 A1* | 5/2014 | Chaffins | ............ | H04Q 11/0067 398/58 |
| 2016/0044391 A1* | 2/2016 | Wu | ..................... | H04L 12/2898 398/45 |
| 2016/0080208 A1* | 3/2016 | Takemoto | ............ | H04L 47/805 398/66 |
| 2017/0070295 A1* | 3/2017 | Remein | ............... | H04J 14/0282 |
| 2017/0105061 A1* | 4/2017 | Kim | ................... | H04Q 11/0067 |
| 2017/0338891 A1* | 11/2017 | Sasaki | ................... | H04B 10/27 |
| 2018/0316436 A1* | 11/2018 | Gao | ...................... | H04B 10/66 |
| 2019/0207680 A1* | 7/2019 | Wang | .................... | H04J 14/08 |

FOREIGN PATENT DOCUMENTS

| | | |
|---|---|---|
| CN | 105530201 A | 4/2016 |
| EP | 2487833 A1 | 8/2012 |

OTHER PUBLICATIONS

Jing, A New Method for the Application of Fiber to the Home in Internet Plus Era, Jan. 2017, ICEMEET, All Document. (Year: 2017).*

English Translation of International Search Report dated Nov. 9, 2017; International Patent Application No. PCT/CN2017/100567. ISA/CN.

* cited by examiner

DATA TRANSMISSION METHOD AND DEVICE

CROSS-REFERENCE TO RELATED APPLICATION

This application is a 35 U.S.C. 371 national stage filing of PCT Application No. PCT/CN2017/100567 filed on Sep. 5, 2017, which claims priority to Chinese patent application No. 201710129334.2, entitled "Data Transmission Method and Device" and filed on Mar. 6, 2017, disclosure of which are incorporated herein by reference in their entirety.

TECHNICAL FIELD

The present application relates to, but is not limited to, the field of communications and, in particular, relates to a data transmission method and device.

BACKGROUND

In Institute of Electrical and Electronics Engineers (IEEE) Ethernet Passive Optical Network (EPON) and 10 Gigabit Ethernet Passive Optical Network (10G-EPON) systems, a data frame fragmentation transmission is not supported. In the process of transmitting uplink data by an Optical Network Unit (ONU), when a remaining uplink bandwidth is not enough to transmit a complete to-be-transmitted Media Access Control (MAC) frame, the remaining uplink bandwidth is discarded, and the to-be-transmitted MAC frame is transmitted after the ONU acquires an uplink bandwidth next time. The same applies when downlink data is transmitted by an Optical Line Terminal (OLT). That is, in the EPON and 10G-EPON systems, a MAC frame is not transmitted by being divided into multiple parts, in other words, the MAC frame is not fragmented for transmission in the EPON and 10G-EPON systems. Under such a mechanism, each MAC frame transmitted by the ONU is not divided into fragments to be transmitted, so a receiving side of the OLT can always complete the reception of a complete MAC frame at one time. A reassembly buffer is not needed to be configured on the receiving side of the OLT, so that a buffer of the receiving side of the OLT can be effectively reduced. However, such a mechanism discarding the remaining uplink bandwidth that does not satisfy the transmission condition leads to the uplink bandwidth wastage. With the gradual accumulation of the uplink bandwidth wastage, a large delay occurs in data transmission in an uplink direction.

The IEEE next generation Passive Optical Network (PON) and 100 Gigabit EPON (100G-EPON) support multiple channels. Each MAC frame is divided into multiple quanta, and each quantum has 8 bytes. Multiple quanta of one MAC frame may be distributed on different channels for transmission, and one quantum is transmitted as long as a bandwidth is sufficient for 8 bytes. Compared to the EPON and 10G-EPON systems in which a complete MAC frame is transmitted, quantum-based transmission can greatly improve bandwidth utilization and reduce transmission delay. However, on the other hand, when a MAC frame sequence is converted into a quantum sequence, a quantum is a transmission unit. The boundary of the MAC frame will not be easily identified during the transmission of the quantum, in other words, about the bandwidth utilization, a transmitter only considers how many quanta can be sent, but is less likely to consider whether a complete MAC frame can be transmitted, so a part of quanta of one MAC frame will be transmitted in a previous bandwidth, and a part of the quanta will be transmitted in a next bandwidth. That is, one part of the MAC frame is transmitted in the previous bandwidth, and another part of the MAC frame is transmitted in the next bandwidth. When fragmentation is involved in the process of the transmitter transmitting the MAC frame, a receiver is required to preserve a firstly received fragment and assemble a complete MAC frame until receive the rest of the MAC frame. For a certain MAC frame, the maximum buffer of the receiver is the size of the MAC frame. For a data stream of the transmitter, the maximum buffer of the receiver is the size of the largest MAC frame possible in the data stream. For a transmitter, the largest buffer of the receiver is the sum of the maximum buffers supported by all data streams. For multiple transmitters, the largest buffer of the receiver is the sum of the maximum buffers supported by all data streams of all transmitters.

Similar problems also exist in International Telecommunication Union-Telecommunication Sector (ITU-T) Gigabit Passive Optical Network (GPON), 10 Gigabit Passive Optical Network 1 (XG-PON1), and Next Generation Passive Optical Network 2 (NG-PON2). Taking NG-PON2 as an example, in NG-PON2, a bandwidth allocated by an OLT to an ONU is allocated to a Transmission Container (T-CONT). In the ONU, when the bandwidth in the T-CONT is insufficient to transmit a complete to-be-transmitted frame, the to-be-transmitted frame is cut, then a former part is transmitted in a remaining bandwidth, and the latter part is transmitted in a next allocated bandwidth. Therefore, similar to 100G-EPON, reassembly buffer size issues are involved on the OLT side.

The analysis of the reassembly buffers is performed as follows, taking 100G-EPON as an example. The 100G-EPON may support 60K Logical Link IDs (LLIDs) at a maximum. Data frame fragmentation transmission is supported on each logical link identified by a LLID, then a data stream (referred to as a fragmentable data stream in the present application) including the data frame fragmentation transmission is formed, and each logical link supports transmission of a jumbo packet, where the length of the jumbo packet is 10K bytes, and a 10K byte reassembly buffer is required for each logical link on the receiving side (the size of a reassembly buffer may be reduced by a suitable method on the receiving side, but the size of the reassembly buffer is generally related to the maximum frame length, and in the present application, in order to simplify the description, only the maximum frame length is considered as a factor of the reassembly buffer), so the theoretically required reassembly buffer is: 60K (the number of LLIDs supported for the data frame fragmentation transmission)×10 KBytes (the maximum packet length supported by per logical link)=600 Mbytes.

The larger the reassembly buffer on the receiving side is, the more logical link LLIDs for fragmentation transmission or the larger the longest packet can be supported. The reassembly buffer on the receiving side is generally implemented in an integrated chip, so the cost of the integrated chip on the receiving side is high. On the other hand, if the reassembly buffer on the receiving side is reduced in order to reduce the cost, the situation in which the reassembly buffer is not enough for use so that a packet loss is caused may occur on the receiving side.

SUMMARY

The following is a summary of the subject matter described herein in detail. This summary is not intended to limit the scope of the claims.

Embodiments of the present application provide a data transmission method and device, which can effectively prevent packet loss.

According to a first aspect of the present application, a data transmission method is provided and includes: an OLT divides logical links supported by an ONU into at least one logical link group; the OLT allocates a bandwidth to each of the at least one logical link group of the ONU, so one or more logical links in each of the at least one logical link group of the ONU share the bandwidth to transmit data.

In an exemplary embodiment, the method may further include: the OLT acquires the maximum number of fragmentable data streams according to a reassembly buffer size of the OLT, where the number of the at least one logical link group does not exceed the number of the fragmentable data streams.

In an exemplary embodiment, the maximum number of fragmentable data streams may be acquired in a following manner: the maximum number of fragmentable data streams=the reassembly buffer size/the maximum frame length supported by each of the one or more logic links.

In an exemplary embodiment, the reassembly buffer size satisfies at least one of: the maximum number of ONUs supported by a passive optical network system; or fragmentable data streams supported by each ONU, where the number of fragmentable data streams supported by each ONU is one or more.

In an exemplary embodiment, the logical links supported by the ONU may be divided into at least one logical link group through at least one of: a weight of each of the logical links, a priority of each of the logical links, a service carried by each of the logical links, or a user to which each of the logical links belongs.

In an exemplary embodiment, after the one or more logical links within the each logical link group of the ONU transmit the data, a data stream including at least one of a data frame or data frame fragments is formed.

In an exemplary embodiment, when the data stream includes the data frame fragments, no other data frame or no other data frame fragment is included between data frame fragments belonging to a same data frame.

In an exemplary embodiment, the one or more logical links within each of the at least one logical link group of the ONU share the bandwidth to transmit the data according to a scheduling algorithm. When a logical link is scheduled for transmitting data and the logical link is able to transmit a complete frame, data of a next frame is continuously transmitted; and when a logical link is scheduled for transmitting the data and the logical link is not able to transmit the complete frame, part of the data of the next frame is transmitted through the logical link and remaining part of the data of the next frame is transmitted in a next bandwidth.

In an exemplary embodiment, when the next bandwidth is acquired by each of the at least one logical link group of the ONU, the logical link having remaining frame data within each of the at least one logical link group of the ONU preferentially transmits the remaining frame data.

In an exemplary embodiment, the ONU serializes to-be-transmitted data frames of the one or more logical links within each of the at least one logical link group into a data frame queue according to a scheduling algorithm.

In an exemplary embodiment, after an uplink bandwidth is acquired by each of the at least one logical link group of the ONU, a to-be-transmitted data frame is acquired from the data frame queue, the to-be-transmitted data frame is divided into multiple quanta, and a corresponding quantum is transmitted according to a size of the uplink bandwidth until the uplink bandwidth is exhausted or no to-be-transmitted data frame exists.

In an exemplary embodiment, the scheduling algorithm includes at least one of: fair scheduling, priority scheduling, weight scheduling or buffer scheduling.

In an exemplary embodiment, the bandwidth is acquired in at least one of the following manners: each of the one or more logic links within the each of the at least one logical link group applies for a bandwidth, and the OLT allocates the bandwidth to each of the at least one logical link group according to a sum of bandwidths applied by the one or more logic links within each of the at least one logical link group; or each of the at least one logical link group sums up bandwidth requirements of the one or more logical links within the group to implement a uniform application, and the OLT allocates the bandwidth to each of the at least one logical link group according to the uniform application.

In an exemplary embodiment, the method further includes: the OLT reserves at least one fragmentable data stream or logical link group for an unregistered ONU.

According to a second aspect of the present application, a data transmission method is further provided and includes: an OLT locally divides logical links supported by an ONU into at least one logical link group; and the OLT allocates a bandwidth to each of the at least one logical link group, so that one or more logical links in each of the at least one logical link group share the bandwidth to transmit data.

In an exemplary embodiment, the method further includes: the OLT acquires the maximum number of fragmentable data streams of the ONU according to a reassembly buffer size of the ONU, where the number of at least one logical link group of the ONU divided by the OLT does not exceed the maximum number of fragmentable data streams of the ONU.

In an exemplary embodiment, the maximum number of fragmentable data streams may be acquired in a following manner: the maximum number of fragmentable data streams=the reassembly buffer size/the maximum frame length supported by each of the one or more logic links.

In an exemplary embodiment, the reassembly buffer size of the ONU is actively reported to the OLT by the ONU; or the reassembly buffer size of the ONU is reported to the OLT in response to a request of the OLT.

In an exemplary embodiment, when the OLT does not acquire a reassembly buffer size of the ONU, the logical links supported by the ONU are divided into a logical link group.

In an exemplary embodiment, the logical links supported by the ONU are divided into at least one logical link group through at least one of: a weight of each of the logical links, a priority of each of the logical links, a service carried by each of the logical links, or a user to which each of the logical links belongs.

In an exemplary embodiment, after the one or more logical links within each of the at least one logical link group of the OLT transmit the data, a data stream including at least one of a data frame or data frame fragments is formed.

In an exemplary embodiment, when the data stream includes the data frame fragments, no other data frame or no other data frame fragment is included between data frame fragments belonging to a same data frame.

In an exemplary embodiment, the one or more logical links within each of the at least one logical link group of the OLT share the bandwidth to transmit data according to a scheduling algorithm. When a logical link is scheduled for transmitting data and the logical link is able to transmit a complete frame, data of a next frame is continuously transmitted; and when a logical link is scheduled for transmitting the data and the logical link is not able to transmit the complete frame, part of the data of the next frame is transmitted through the logical link and remaining part of the data of the next frame is transmitted in a next bandwidth.

In an exemplary embodiment, when the next bandwidth is acquired by each of the at least one logical link group of the OLT, the logical link having remaining frame data within each of the at least one logical link group of the OLT preferentially transmits the remaining frame data.

In an exemplary embodiment, the OLT serializes to-be-transmitted data frames of the one or more logical links within each of the at least one logical link group into a data frame queue according to a scheduling algorithm.

In an exemplary embodiment, after a downlink bandwidth is acquired by each of the at least one logical link group of the OLT, a to-be-transmitted data frame is acquired from the data frame queue, the to-be-transmitted data frame is divided into multiple quanta, and a corresponding quantum is transmitted according to a size of the downlink bandwidth until the downlink bandwidth is exhausted or no to-be-transmitted data frame exists.

In an exemplary embodiment, the scheduling algorithm includes at least one of: fair scheduling, priority scheduling, weight scheduling or buffer scheduling.

According to a third aspect of the present application, a data transmission device is provided and applied to an OLT. The device includes: a first division module, which is configured to divide logical links supported by an ONU into at least one logical link group; and a first transmission module, which is configured to allocate a bandwidth to each of the at least one logical link group of the ONU, so that one or more logical links within each of the at least one logical link group of the ONU share the bandwidth to transmit data.

In an exemplary embodiment, the device may further include: a first acquisition module, which is configured to acquire the maximum number of fragmentable data streams according to a reassembly buffer size of the OLT, where the number of logical link groups does not exceed the number of fragmentable data streams.

In an exemplary embodiment, the first acquisition module may be configured to acquire the maximum number of fragmentable data streams in a following manner: the maximum number of fragmentable data streams=the reassembly buffer size/the maximum frame length supported by each of the one or more logic links.

In an exemplary embodiment, the reassembly buffer size satisfies at least one of: the maximum number of ONUs supported by a passive optical network system; or fragmentable data streams supported by each ONU, where the number of fragmentable data streams supported by each ONU is one or more.

In an exemplary embodiment, the first division module may be configured to divide the logical links supported by the ONU into at least one logical link group through at least one of: a weight of each of the logical links, a priority of each of the logical links, a service carried by each of the logical links, or a user to which each of the logical links belongs.

In an exemplary embodiment, after the one or more logical links within each of the at least one logical link group of the ONU transmit the data, a data stream including at least one of a data frame or data frame fragments is formed.

In an exemplary embodiment, when the data stream includes the data frame fragments, no other data frame or no other data frame fragment is included between data frame fragments belonging to a same data frame.

In an exemplary embodiment, the one or more logical links within each of the at least one logical link group of the ONU share the bandwidth to transmit the data according to a scheduling algorithm. When a logical link is scheduled for transmitting data and the logical link is able to transmit a complete frame, data of a next frame is continuously transmitted; and when a logical link is scheduled for transmitting the data and the logical link is not able to transmit the complete frame, part of the data of the next frame is transmitted through the logical link and remaining part of the data of the next frame is transmitted in a next bandwidth.

In an exemplary embodiment, when the next bandwidth is acquired by each of the at least one logical link group of the ONU, the logical link having remaining frame data within each of the at least one logical link group of the ONU preferentially transmits the remaining frame data.

In an exemplary embodiment, the ONU serializes to-be-transmitted data frames of the one or more logical links within the each of the at least one logical link group into a data frame queue according to a scheduling algorithm.

In an exemplary embodiment, after an uplink bandwidth is acquired by each of the at least one logical link group of the ONU, a to-be-transmitted data frame is acquired from the data frame queue, the to-be-transmitted data frame is divided into multiple quanta, and a corresponding quantum is transmitted according to a size of the uplink bandwidth until the uplink bandwidth is exhausted or no to-be-transmitted data frame exists.

In an exemplary embodiment, the scheduling algorithm may include at least one of: fair scheduling, priority scheduling, weight scheduling or buffer scheduling.

In an exemplary embodiment, the bandwidth may be acquired in at least one of the following manners: each of the one or more logic links within each of the at least one logical link group applies for a bandwidth, and the OLT allocates the bandwidth to each of the at least one logical link group according to a sum of bandwidths applied by the one or more logic links within each of the at least one logical link group; or each of the at least one logical link group sums up bandwidth requirements of the one or more logical links within the group to implement a uniform application, and the OLT allocates the bandwidth to each of the at least one logical link group according to the uniform application.

In an exemplary embodiment, the device may further include a module configured to reserve at least one fragmentable data stream or logical link group for an unregistered ONU.

According to another aspect of the present application, a data transmission device is provided and applied to an OLT. The device includes: a second division module, which is configured to locally divide logical links supported by an ONU into at least one logical link group; and a second transmission module, which is configured to allocate a bandwidth to each of the at least one logical link group, so that one or more logical links within each of the at least one logical link group share the bandwidth to transmit data.

In an exemplary embodiment, the device may further include: a second acquisition module which is configured to acquire the maximum number of fragmentable data streams of the ONU according to a reassembly buffer size of the ONU, where the number of the at least one logical link group of the ONU does not exceed the maximum number of fragmentable data streams of the ONU.

In an exemplary embodiment, the second acquisition module may be configured to acquire the maximum number of fragmentable data streams in a following manner: the maximum number of fragmentable data streams=the reassembly buffer size/the maximum frame length supported by each of the one or more logic links.

In an exemplary embodiment, the reassembly buffer size of the ONU is actively reported to the OLT by the ONU; or the reassembly buffer size of the ONU is reported to the OLT in response to a request of the OLT.

In an exemplary embodiment, the device may further include: a third division module which is configured to divide the logical links supported by the ONU into a logical link group when the OLT does not acquire a reassembly buffer size of the ONU.

In an exemplary embodiment, the second division module may be configured to divide the logical links supported by the ONU into at least one logical link group through at least one of: a weight of each of the logical links, a priority of each of the logical links, a service carried by each of the logical links, or a user to which each of the logical links belongs.

In an exemplary embodiment, after the one or more logical links within each of the at least one logical link group of the OLT transmit the data, a data stream including at least one of a data frame or data frame fragments is formed.

In an exemplary embodiment, when the data stream includes the data frame fragments, no other data frame or no other data frame fragment is included between data frame fragments belonging to a same data frame.

In an exemplary embodiment, the one or more logical links within the each of the at least one logical link group of the OLT share the bandwidth to transmit the data according to a scheduling algorithm. When a logical link is scheduled for transmitting data and the logical link is able to transmit a complete frame, data of a next frame is continuously transmitted; and when a logical link is scheduled for transmitting the data and the logical link is not able to transmit the complete frame, part of the data of the next frame is transmitted through the logical link and remaining part of the data of the next frame is transmitted in a next bandwidth.

In an exemplary embodiment, when the next bandwidth is acquired by each of the at least one logical link group of the ONU, the logical link having remaining frame data within each of the at least one logical link group of the ONU preferentially transmits the remaining frame data.

In an exemplary embodiment, the OLT serializes to-be-transmitted data frames of the one or more logical links within each of the at least one logical link group into a data frame queue according to a scheduling algorithm.

In an exemplary embodiment, after a downlink bandwidth is acquired by each of the at least one logical link group of the OLT, a to-be-transmitted data frame is acquired from the data frame queue, the to-be-transmitted data frame is divided into multiple quanta, and a corresponding quantum is transmitted according to a size of the downlink bandwidth until the downlink bandwidth is exhausted or no to-be-transmitted data frame exists.

In an exemplary embodiment, the scheduling algorithm may include, but is not limited to, fair scheduling, priority scheduling, weight scheduling and buffer scheduling.

In addition, embodiments of the present application further provide a storage medium, storing data transmission programs which, when executed by a processor, implement the steps of the data transmission method in the first aspect.

In addition, embodiments of the present application further provide a storage medium, storing data transmission programs which, when executed by a processor, implement the steps of the data transmission method in the second aspect.

Though the present application, an OLT divides logical links supported by an ONU into at least one logical link group; and the OLT allocates a bandwidth to each of the at least one logical link group of the ONU, so that one or more logical links in at least one logical link group of the ONU share the bandwidth to transmit data. In addition, the OLT locally divides logical links supported by the ONU into at least one logical link group; and the OLT allocates a bandwidth to each of the at least one logical link group of the OLT, so that one or more logical links in at least one logical link group of the OLT share the bandwidth to transmit data. Logical links of a transmitter are grouped so that multiple logical links are grouped into a logical link group, and thus the number of fragmentable links can be effectively reduced, and the requirement for a reassemble buffer of a receiver is reduced. That is to say, the OLT can flexibly configure the data transmission manner according to a reassemble buffer condition of the receiving end, and therefore packet loss is prevented when a reassemble buffer of the receiving side is insufficient in a data transmission process, and a technical effect of effectively preventing packet loss is achieved.

Other aspects can be understood after the drawings and the detailed description are read and understood.

DETAILED DESCRIPTION

The present application will be described hereinafter in detail through embodiments with reference to the drawings. It is to be noted that the terms "first", "second" and the like in the description, claims and drawings of the present application are used to distinguish between similar objects and are not necessarily used to describe a particular order or sequence.

Figure 1:
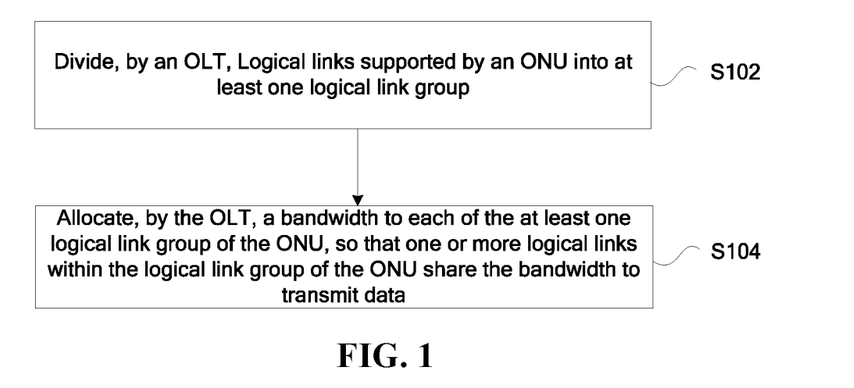
FIG. 1 is a flowchart of a data transmission method according to an embodiment of the present application.

FIG. 1 is a flowchart of a data transmission method according to an embodiment of the present application. As shown in FIG. 1, the data transmission method of the present embodiment includes steps described below.

In step S102, an OLT divides logical links supported by an ONU into at least one logical link group.

In step S104, the OLT allocates a bandwidth to each of the at least one logical link group of the ONU, so that one or more logical links within each of the at least one logical link group of the ONU share the bandwidth to transmit data.

The execution order of step S102 and step S104 may be interchanged, that is, step S104 may be performed first, and then step S102 is performed.

The application scenario of the above data transmission method includes, but is not limited to a passive optical network system. In this application scenario, the OLT divides logical links supported by the ONU into at least one logical link group; and the OLT allocates a bandwidth to each of the at least one logical link group of the ONU, so that one or more logical links within each of the at least one logical link group of the ONU share the bandwidth to transmit data. That is to say, the OLT can flexibly configure the data transmission manner according to a reassemble buffer condition of the receiving end, and therefore packet loss is prevented when a reassemble buffer of the receiving side is insufficient in a data transmission process, and a technical effect of effectively preventing packet loss is achieved.

The embodiment will be described below in conjunction with examples.

The OLT acquires the maximum number of fragmentable data streams according to the reassembly buffer capacity of the OLT, and divides the logical links supported by each ONU into one or more groups, so that the total number of logical link groups of all ONUs does not exceed the maximum number of fragmentable data streams. Each logical link group corresponds to one fragmentable data stream, and the OLT allocates the bandwidth to the logical link groups of the ONU. After the bandwidth is obtained by Each logical link group, the obtained bandwidth is used according to a local scheduling algorithm (such as fair scheduling, priority scheduling, weight scheduling, and buffer scheduling), and uplink data is transmitted on one or more logical links in the group.

In an exemplary embodiment, the OLT acquires the maximum number of fragmentable data streams according to a reassembly buffer size of the OLT, where the number of logical link groups does not exceed the number of fragmentable data streams.

The maximum number of fragmentable data streams may be acquired in a following manner: the maximum number of fragmentable data streams=the reassembly buffer size/the maximum frame length supported by each logic link.

The reassembly buffer size satisfies at least one of: the maximum number of ONUs supported by a passive optical network system; or fragmentable data streams supported by each ONU, where the number of fragmentable data streams supported by each ONU is one or more.

In an exemplary embodiment, the logical links supported by the ONU may be divided into at least one logical link group based on at least one of: a weight of each of the logical links, a priority of each of the logical links, a service carried by each of the logical links, or a user to which each of the logical links belongs.

In an exemplary embodiment, after the data is transmitted through the one or more logical links within each of the at least one logical link group of the ONU, a data stream including at least one of a data frame or data frame fragments is formed.

In an exemplary embodiment, when the data stream includes the data frame fragments, no other data frame or no other data frame fragment is included between data frame fragments belonging to the same data frame.

In an exemplary embodiment, one or more logical links within each logical link group of the ONU share the bandwidth to transmit the data according to a scheduling algorithm. When a logical link is scheduled for transmitting data and the logical link is able to transmit a complete frame, data of a next frame is continuously transmitted; and when a logical link is scheduled for transmitting the data and the logical link is not able to transmit a complete frame, part of the data of the next frame is transmitted through the logical link and remaining part of the data of the next frame is transmitted in a next bandwidth. When the next bandwidth is acquired by the logical link group of the ONU, the logical link having remaining frame data within the logical link group of the ONU preferentially transmits the remaining frame data.

In an exemplary embodiment, the ONU serializes to-be-transmitted data frames of one or more logical links within each logical link group into a data frame queue according to a scheduling algorithm. After an uplink bandwidth is acquired by each logical link group of the ONU, a to-be-transmitted data frame is acquired from the data frame queue, the to-be-transmitted data frame is divided into multiple quanta, and a corresponding quantum is transmitted according to a size of the uplink bandwidth until the uplink bandwidth is exhausted or no to-be-transmitted data frame exists.

In an exemplary embodiment, the scheduling algorithm may include at least one of: fair scheduling, priority scheduling, weight scheduling or buffer scheduling.

The bandwidth may be acquired in at least one of the following manners: one or more logic links within each logical link group applies for a bandwidth respectively, and the OLT allocates the bandwidth to each logical link group according to a sum of bandwidths applied by the one or more logic links within the logical link group; or each logical link group sums up bandwidth requirements of the one or more logical links within the group to implement a uniform application, and the OLT allocates the bandwidth to each logical link group according to the uniform application.

In an exemplary embodiment, the OLT reserves at least one fragmentable data stream or logical link group for an unregistered ONU.

The embodiment will be described below in conjunction with examples.

The manner in which the OLT or ONU determines the maximum number of fragmentable data streams the OLT or ONU supports is described below.

In the embodiment, the reassembly buffer size/the maximum frame length=the maximum number of fragmentable data streams.

For example, the maximum reassembly buffer is 4 MB, and the maximum packet length is 10 KB, and a reassembly buffer size of 10 KB is set for each fragmentable data stream, and thus the maximum number of fragmentable data streams is 4 MB/10 KB=400.

The foregoing is an exemplary solution of the present application. A solution which has a modification on the basis of the exemplary solution of the present application may complete a same target, except that the acquired maximum number of fragmentable data streams is different, and thus the solution is also in the protection scope of the present application. For example, if the reassembly buffer for the fragmentable data streams is not directly set to 10 KB buffer of the maximum packet length, for example, a reassembly buffer of 2 KB is set first, and when the buffer of 2 KB is full, an additional reassembly buffer of 2 KB may be set. The larger number of fragmentable data streams can be supported by progressively increasing the reassembly buffer.

The number of fragmentable data streams actually in use may be dynamically adjusted without exceeding the maximum number of fragmentable data streams. Accordingly, the logical link groups on the OLT or ONU side may also be adjusted.

The fragmentable data streams and logical link groups of the ONU are described below.

The OLT groups the logical links of each ONU to form at least one logical link group. The OLT may also dynamically configure the logical links into the logical link group. Each logical link group may have one or more logical links. Each logical link group corresponds to a fragmentable data stream and the OLT allocates a bandwidth for the logical link group of the ONU. After each logical link group of the ONU acquires a bandwidth, one or more logical links in the logical link group use the bandwidth to transmit data according to a certain scheduling algorithm, such as fair scheduling, priority scheduling, weight scheduling, and buffer scheduling. When the fair scheduling algorithm is used, each logical link in a logical link group fairly and equally uses the bandwidth to transmit data, and each logical link transmits data of equal or close lengths within one bandwidth; when the priority scheduling algorithm is used, a logical link with a higher priority in a logical link group preferentially transmits data, and a logical link with a lower priority transmits data later; when the weight scheduling algorithm is used, the ratio of data transmitted by the multiple logical links within a logical link group using the bandwidth is the same or close to the weight ratio of the multiple logical links; when the buffer scheduling algorithm is used, in one logical link group, a logical link with more to-be-transmitted data in the buffer transmits data preferentially, and a logical link with less to-be-transmitted data in the buffer transmits data later. In a logical link group, when a logical link transmits data, a complete frame must be transmitted, and then other logical links may continue to transmit data. When at the end of a bandwidth, a logical link is not enough to transmit a complete frame, as much data as possible is transmitted, and the rest is waiting for a next bandwidth to be transmitted. When the next bandwidth arrives, the logical link which has a remaining to-be-transmitted part preferentially transmits data. After the transmission of the remaining part is completed, each logical link transmits data according to the scheduling algorithm again. Each logical link in a logical link group may apply for a bandwidth separately, or may apply for a bandwidth after unified summation, but the OLT only allocates a bandwidth for the logical link group. The fragmentable data streams and logical link groups of the OLT are described below.

For a specific ONU, when the OLT does not acquire the reassembly buffer capability or related information of the ONU, all logical links of the ONU are grouped as one logical link group. After the OLT learns the reassembly buffer capability or the related information of the ONU, the OLT may continue to group all logical links of the ONU as one logical link group, or group (local action) the logical links according to the reassembly buffer capability or the related information of the ONU. The grouping action is embodied in a logical link group corresponding to a fragmentable data stream. The OLT schedules a bandwidth for local logical link groups, after each logical link group of the ONU acquires a scheduled bandwidth, one or more logical links in the logical link group use the bandwidth to transmit data according to a certain scheduling algorithm, such as fair scheduling, priority scheduling, weight scheduling, and buffer scheduling. In a logical link group, when a logical link transmits data, a complete frame must be transmitted, and then other logical links may continue to transmit data. When at the end of a bandwidth, a logical link is not enough to transmit a complete frame, as much data as possible is transmitted, and the rest is waiting for a next bandwidth to be transmitted. When the next bandwidth arrives, the logical link which has remaining to-be-transmitted part preferentially transmits data. After the transmission of the remaining part is completed, each logical link transmits data according to the scheduling algorithm again.

Exemplary Embodiment 1

In a passive optical network system, each ONU supports an uplink fragmentable data stream, and the size of an OLT reassembly buffer is designed according to the maximum number of ONUs that can be supported by the passive optical network (Next Generation EPON (NGEPON), NG-PON2) system, for example, the maximum packet length multiplied by the maximum number of ONUs is the size of the OLT reassembly buffer. In the operation of the passive optical network system, all logical links in each ONU are set as a logical link group, which is used as an uplink bandwidth container. The OLT allocates an uplink bandwidth to the logical link group of the ONU. The logical link group of each ONU uses the uplink bandwidth according to a local policy, and uplink data is transmitted on each logical link (LLID, 10 Gigabit Passive Optical Network Encapsulation Method Port (XGEM-Port), 10GPON Encapsulation Port).

The NGEPON is taken as an example.

1. A reassembly buffer of an OLT is designed according to the maximum number of ONUs, that is, the maximum number of ONUs under the condition of supporting the maximum packet length, for example, the reassembly buffer is equal to the maximum number of ONUs multiplied by the maximum packet length.

2. When an NGEPON system is started, the OLT acquires the reassembly buffer and the supported maximum packet length, and the reassembly buffer divided by the maximum packet length equals the number of ONUs which can be supported.

3. When a new ONU needs to be added, the OLT checks the number of ONUs currently online. If the number of online ONUs does not reach the number of ONUs that can be supported, the OLT allows the new ONU to be added; otherwise, the OLT does not allow the ONU to be added.

4. During the operation of the NGEPON system, the OLT configures all logical link LLIDs of each ONU to have a logical link group Group Link ID (GLID) and the OLT allocates an uplink bandwidth to the logical link group of each ONU.

5. The ONU serializes to-be-transmitted data frames of one or more logical links in the logical link group according to a certain scheduling algorithm (such as fair scheduling, priority scheduling, weight scheduling, and buffer scheduling) into a data frame queue.

6. After the uplink bandwidth is acquired by the logical link group of each ONU, a to-be-transmitted data frame is acquired from the data frame queue. The to-be-transmitted data frame is divided into multiple quanta, and a corresponding quantum is transmitted according to the size of the uplink bandwidth until the uplink bandwidth is exhausted or no to-be-transmitted data frame exists.

NG-PON2 is taken as an example.

1. A reassembly buffer of an OLT is designed according to the maximum number of ONUs, that is, the maximum number of ONUs under the condition of supporting the maximum packet length, for example, the reassembly buffer is equal to the maximum number of ONUs multiplied by the maximum packet length.

2. When an NG-PON2 system is started, the OLT acquires the reassembly buffer and the supported maximum packet length, and the reassembly buffer divided by the maximum packet length equals the number of ONUs which can be supported.

3. When a new ONU needs to be added, the OLT checks the number of ONUs currently online. If the number of online ONUs does not reach the number of ONUs that can be supported, the OLT allows the new ONU to be added; otherwise, the OLT does not allow the ONU to be added.

4. During the operation of the NG-PON2 system, the OLT configures all logical link XGEM-Ports of each ONU into a logical link group, that is, a T-CONT which is equal to an ONU-ID, and the OLT allocates an uplink bandwidth to the logical link group of each ONU.

5. After the uplink bandwidth is acquired by the logical link group of each ONU, the uplink data frame is transmitted on one or more XGEM-Ports according to a certain scheduling algorithm (such as fair scheduling, priority scheduling, weight scheduling, and buffer scheduling).

6. When a data frame on a certain XGEM-Port in the logical link group is scheduled to be transmitted and the uplink bandwidth is able to transmit a complete frame, data of a next frame is continuously transmitted; and when the uplink bandwidth is not able to transmit the complete frame, part of the data of the next frame of the XGEM-Port is transmitted and remaining part of the data of the next frame is transmitted in a next bandwidth.

7. When the next bandwidth is acquired by the logical link group of the ONU, the logical link XGEM-Port having remaining frame data within the logical link group of the ONU preferentially transmits the remaining frame data.

Exemplary Embodiment 2

An OLT supports each ONU to support more than one fragmentable data stream link, i.e., support N fragmentable data stream links. The number of fragmentable data streams supported by each ONU is fixed, for example, N=2, or N=3. The OLT divides logical links (LLID, XGEM-Port) of the ONU into logical link groups, and the OLT allocates a bandwidth to the logical link groups of the ONU.

The NGEPON is taken as an example.

1. A reassembly buffer of an OLT is designed according to the number of fragmentable data streams supported by each ONU.

2. When an NGEPON system is started, the OLT acquires the reassembly buffer and the supported maximum packet length, and the reassembly buffer divided by the maximum packet length equals the maximum number of fragmentable data streams which can be supported, which is greater than or equal to the sum of the numbers of fragmentable data streams supported by all ONUs.

3. The OLT groups logical link LLIDs of each ONU to form multiple logical link groups, and the OLT allocates an uplink bandwidth to each logical link group of the ONU.

4. The ONU serializes to-be-transmitted data frames of one or more logical links in the logical link group according to a certain scheduling algorithm (such as fair scheduling, priority scheduling, weight scheduling, and buffer scheduling) into a data frame queue.

5. After the uplink bandwidth is acquired by each logical link group of the ONU, a to-be-transmitted data frame is acquired from the data frame queue. The to-be-transmitted data frame is divided into multiple quanta, and a corresponding quantum is transmitted according to the size of the uplink bandwidth until the uplink bandwidth is exhausted or no to-be-transmitted data frame exists.

NG-PON2 is taken as an example.

1. A reassembly buffer of an OLT is designed according to the number of fragmentable data streams supported by each ONU.

2. When an NGEPON system is started, the OLT acquires the reassembly buffer and the supported maximum packet length, and the reassembly buffer divided by the maximum packet length equals the maximum number of fragmentable data streams which can be supported, which is greater than or equal to the sum of the numbers of fragmentable data streams supported by all ONUs.

3. The OLT groups logical link XGEM-Ports of each ONU to form multiple logical link group T-CONTs, and the OLT allocates an uplink bandwidth to each logical link group of the ONU.

4. After the uplink bandwidth is acquired by each logical link group of the ONU, the uplink data frame is transmitted on one or more XGEM-Ports according to a certain scheduling algorithm (such as fair scheduling, priority scheduling, weight scheduling, and buffer scheduling).

5. When a data frame on a certain XGEM-Port in the logical link group is scheduled to be transmitted and the uplink bandwidth is able to transmit a complete frame, data of a next frame is continuously transmitted; and when the uplink bandwidth is not able to transmit the complete frame, part of the data of the next frame of the XGEM-Port is transmitted and remaining part of the data of the next frame is transmitted in a next bandwidth.

6. When the next bandwidth is acquired by the logical link group of the ONU, a logical link XGEM-Port having remaining frame data within the logical link group of the ONU preferentially transmits the remaining frame data.

Exemplary Embodiment 3

In a passive optical network system, uplink fragmentable data streams supported by each ONU may be flexibly and dynamically adjusted. In the operation of a passive optical network system, an OLT divides logical links of each ONU into at least one logical link group, and the logical link group of each ONU may be dynamically adjusted, for example, the number of logical link groups is increased or reduced, and the logical link members in each logical link group may also be dynamically adjusted. Each ONU may have at least one logical link group, and each logical link group corresponds to one fragmentable data stream. The OLT allocates an uplink bandwidth to each logical link group of the ONU. Each logical link group of the ONU uses the uplink bandwidth according to a local policy, and transmits uplink data on one or more logical links (LLID, XGEM-Port) within the logical link group.

The NGEPON is taken as an example.

1. A reassembly buffer of an OLT satisfies the requirement of the maximum number of fragmentable data streams. 2. When an NGEPON system is started, the OLT acquires the reassembly buffer and the supported maximum packet length, and the reassembly buffer divided by the maximum packet length equals the maximum number of fragmentable data streams which can be supported.

3. When the OLT allocates a logical link LLID to an online ONU, the OLT checks the number of fragmentable data streams configured. If the number of fragmentable data streams configured is less than the maximum number of fragmentable data streams, the OLT configures the LLID as a new logical link group GLID or may merge the LLID with other LLIDs into a logical link group GLID, or may merge the LLID into one logical link group GLID of the ONU; otherwise, 4. The OLT merges one or more LLIDs of the ONU into one logical link group GLID, or merges one or more LLIDs of other ONUs into one logical link group GLID, and meanwhile configures the LLID as a logical link group GLID; or, 5. The OLT merges the LLID into a logical link group GLID of the ONU.

6. During the operation of the NGEPON system, the OLT allocates an uplink bandwidth to one or more logical link group T-CONTs of the ONU.

7. The ONU serializes to-be-transmitted data frames of one or more logical links in the logical link group into a data frame queue according to a certain scheduling algorithm (such as fair scheduling, priority scheduling, weight scheduling, and buffer scheduling)

8. After the uplink bandwidth is acquired by each logical link group of the ONU, a to-be-transmitted data frame is acquired from the data frame queue. The to-be-transmitted data frame is divided into multiple quanta, and a corresponding quantum is transmitted according to the size of the uplink bandwidth until the uplink bandwidth is exhausted or no to-be-transmitted data frame exists.

NG-PON2 is taken as an example.

1. A reassembly buffer of an OLT satisfies the requirement of the maximum number of fragmentable data streams.

2. When an NG-PON2 system is started, the OLT acquires the reassembly buffer and the supported maximum packet length, and the reassembly buffer divided by the maximum packet length equals the maximum number of fragmentable data streams which can be supported.

3. When the OLT allocates an XGEM-Port to an online ONU, the OLT checks the number of fragmentable data streams configured. If the number of fragmentable data streams configured is less than the maximum number of fragmentable data streams, the OLT configures the XGEM-Port as a new logical link group T-CONT or may merge the XGEM-Port with other XGEM-Ports into a logical link group T-CONT, or may merge the XGEM-Port into one logical link group T-CONT of the ONU; otherwise, 4. The OLT merges one or more XGEM-Ports of the ONU into one logical link group T-CONT, or merges one or more XGEM-Ports of other ONUs into one logical link group T-CONT, and meanwhile configures the XGEM-Port as a logical link group T-CONT; or 5. The OLT merges the XGEM-Port into a logical link group T-CONT of the ONU.

6. During the operation of the NG-PON2 system, the OLT allocates an uplink bandwidth to one or more logical link group of the ONU.

7. After the uplink bandwidth is acquired by each logical link group of the ONU, the uplink data frame is transmitted on one or more XGEM-Ports in the group according to a certain scheduling algorithm (such as fair scheduling, priority scheduling, weight scheduling, and buffer scheduling).

8. When a data frame of a certain XGEM-Port in the logical link group is scheduled to be transmitted and the uplink bandwidth is able to transmit a complete frame, data of a next frame is continuously transmitted; and when the uplink bandwidth is not able to transmit the complete frame, part of the data of the next frame of the XGEM-Port is transmitted and remaining part of the data of the next frame is transmitted in a next bandwidth.

9. When the next bandwidth is acquired by the logical link group of the ONU, a logical link XGEM-Port having remaining frame data within the logical link group of the ONU preferentially transmits the remaining frame data.

Exemplary Embodiment 4

On the basis of embodiment 3, at least one fragmentable data stream or logical link group is reserved for each unregistered ONU. When an ONU is online, at least one fragmentable data stream or logical link group may be acquired, and an impact on services of other ONUs can be avoided.

The NGEPON is taken as an example.

1. A reassembly buffer of an OLT satisfies the requirement of the maximum number of fragmentable data streams.

2. When an NGEPON system is started, the OLT acquires the reassembly buffer and the supported maximum packet length, and the reassembly buffer divided by the maximum packet length equals the maximum number of fragmentable data streams which can be supported.

3. The OLT reserves a fragmentable data stream or a logical link group GLID for each unregistered or offline ONU.

4. When the OLT allocates a logical link LLID to an online ONU, the OLT checks the number of fragmentable data streams configured. If the number of fragmentable data streams configured is less than the maximum number of fragmentable data streams, the OLT configures the LLID as a new logical link group GLID or may merge the LLID with other LLIDs into a logical link group GLID, or may merge the LLID into one logical link group GLID of the ONU; otherwise, 5. The OLT merges one or more LLIDs of the ONU into one logical link group GLID, or merges one or more LLIDs of other ONUs into one logical link group GLID, and meanwhile configures the LLID as a logical link group GLID; or 6. The OLT merges the LLID into a logical link packet GLID of the ONU.

7. During the operation of the NGEPON system, the OLT allocates an uplink bandwidth to one or more logical link group T-CONT of the ONU.

8. The ONU serializes to-be-transmitted data frames of one or more logical links in the logical link group according to a certain scheduling algorithm (such as fair scheduling, priority scheduling, weight scheduling, and buffer scheduling) into a data frame queue.

9. After the uplink bandwidth is acquired by each logical link group of the ONU, a to-be-transmitted data frame is acquired from the data frame queue. The to-be-transmitted data frame is divided into multiple quanta, and a corresponding quantum is transmitted according to the size of the uplink bandwidth until the uplink bandwidth is exhausted or no to-be-transmitted data frame exists.

NG-PON2 is taken as an example.

1. A reassembly buffer of an OLT satisfies the requirement of the maximum number of fragmentable data streams.

2. When an NG-PON2 system is started, the OLT acquires the reassembly buffer and the supported maximum packet length, and the reassembly buffer divided by the maximum packet length equals the maximum number of fragmentable data streams which can be supported.

3. The OLT reserves a fragmentable data stream or a logical link group GLID for each unregistered or offline ONU.

4. When the OLT allocates an XGEM-Port to an online ONU, the OLT checks the number of fragmentable data streams configured. If the number of fragmentable data streams configured is less than the maximum number of fragmentable data streams, the OLT configures the XGEM-Port as a new logical link group T-CONT, or may merge the XGEM-Port with other XGEM-Ports into a logical link group T-CONT, or may merge the XGEM-Port into one logical link group T-CONT of the ONU; otherwise, 5. The OLT merges one or more XGEM-Ports of the ONU into one logical link group T-CONT, or merges one or more XGEM-Ports of other ONUs into one logical link group T-CONT, and meanwhile configures the XGEM-Port as a logical link group T-CONT; or 6. The OLT merges the XGEM-Port into a logical link group T-CONT of the ONU.

7. During the operation of the NG-PON2 system, the OLT allocates an uplink bandwidth to one or more logical link group of the ONUs.

8. After the uplink bandwidth is acquired by each logical link group of the ONU, the uplink data frame is transmitted on one or more XGEM-Ports in the group according to a certain scheduling algorithm (such as fair scheduling, priority scheduling, weight scheduling, and buffer scheduling).

9. When a data frame of a certain XGEM-Port in the logical link group is scheduled to be transmitted and the uplink bandwidth is able to transmit a complete frame, data of a next frame is continuously transmitted; and when the uplink bandwidth is not able to transmit the complete frame, part of the data of the next frame of the XGEM-Port is transmitted and remaining part of the data of the next frame is transmitted in a next bandwidth.

10. When the next bandwidth is acquired by the logical link group of the ONU, a logical link XGEM-Port having remaining frame data within the logical link group of the ONU preferentially transmits the remaining frame data.

Exemplary Embodiment 5

In a downlink direction, an OLT assumes that each ONU supports one fragmentable data stream or logical link group by default, and after the OLT acquires a reassembly buffer condition of the ONU, the OLT may adjust the number of fragmentable data streams or the logical link group for the ONU.

The NGEPON is taken as an example.

1. An OLT assumes that each ONU supports a fragmentable data stream or a logical link group GLID by default. All LLIDs of the ONU in the OLT in the downlink direction are configured in a logical link group GLID.

2. The ONU reports its own reassembly buffer capability or related information to the OLT.

3. The OLT acquires the maximum number of fragmentable data streams supported by the ONU according to the reassembly buffer capability or related information of the ONU and the maximum supported packet length.

4. The OLT configures logical link group GLIDs for the ONU, and the number of logical link group GLIDs is smaller than the maximum number of fragmentable data streams that the ONU can support, and each LLID of the ONU is respectively merged into a corresponding logical link group GLID.

5. The OLT schedules a downlink bandwidth for each logical link group GLID.

6. The OLT serializes to-be-transmitted data frames of one or more logical links in the logical link group into a data frame queue according to a certain scheduling algorithm (such as fair scheduling, priority scheduling, weight scheduling, and buffer scheduling).

7. After the bandwidth is acquired by each logical link group of the OLT, a to-be-transmitted data frame is acquired from the data frame queue. The to-be-transmitted data frame is divided into multiple quanta, and a corresponding quantum is transmitted according to the size of the uplink bandwidth until the uplink bandwidth is exhausted or no to-be-transmitted data frame exists.

NG-PON2 is taken as an example.

1. An OLT assumes that each ONU supports a fragmentable data stream or a logical link group T-CONT by default. All XGEM-Ports of the ONU in the OLT in the downlink direction are configured in a logical link group T-CONT.

2. The ONU reports its own reassembly buffer capability or related information to the OLT.

3. The OLT acquires the maximum number of fragmentable data streams supported by the ONU according to the reassembly buffer capability or related information of the ONU and the maximum supported packet length.

4. The OLT configures logical link group T-CONTs for the ONU, and the number of the logical link group T-CONTs is smaller than the maximum number of fragmentable data streams that the ONU can support, and each XGEM-Port of the ONU is respectively merged into a corresponding logical link group T-CONT.

5. The OLT schedules a downlink bandwidth for each logical link group GLID.

6. After the uplink bandwidth is acquired by each logical link group of the ONU, the uplink data frame is transmitted on one or more XGEM-Ports in the group according to a certain scheduling algorithm (such as fair scheduling, priority scheduling, weight scheduling, and buffer scheduling).

7. When a data frame of a certain XGEM-Port in the logical link group is scheduled to be transmitted and the bandwidth is able to transmit a complete frame, data of a next frame is continuously transmitted; and when the uplink bandwidth is not able to transmit the complete frame, part of the data of the next frame of the XGEM-Port is transmitted and remaining part of the data of the next frame is transmitted in a next bandwidth.

8. When the next bandwidth is acquired by the logical link group of the ONU, a logical link XGEM-Port having remaining frame data within the logical link group of the ONU preferentially transmits the remaining frame data.

The steps and sequences used in the description of the above embodiments are exemplary solutions of the present application, but the corresponding steps may be adjusted in order, recombined or split, and the purpose of the present application can still be achieved. Therefore, such adjustment, recombination or splitting of the corresponding steps are also within the scope of the present application.

Figure 2:
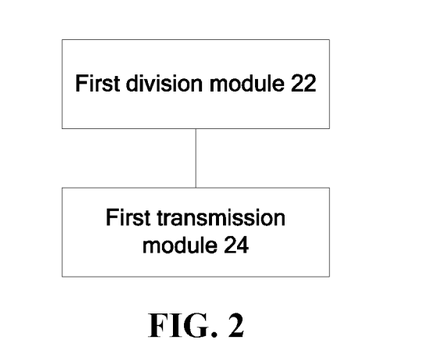
FIG. 2 is a structural block diagram 1 of a data transmission device according to an embodiment of the present application.

FIG. 2 is a structural block diagram 1 of a data transmission device according to an embodiment of the present application. As shown in FIG. 2, the data transmission device provided by the embodiment includes a first division module 22 and a first transmission module 24.

The first division module 22 is configured to divide logical links supported by an ONU into at least one logical link group.

The first transmission module 24 is configured to allocate a bandwidth to each of the at least one logical link group of the ONU, so that one or more logical links within each of the at least one logical link group of the ONU share the bandwidth to transmit data.

In an exemplary embodiment, the application scenario of the above data transmission device includes, but is not limited to a passive optical network system. In this application scenario, the OLT divides logical links supported by the ONU into at least one logical link group; and the OLT allocates a bandwidth to each of the at least one logical link group of the ONU, so that one or more logical links within each of the at least one logical link group of the ONU share the bandwidth to transmit data. That is to say, logical links of a transmitter are grouped so that multiple logical links are grouped into a logical link group, and thus the number of fragmentable links can be effectively reduced, and the requirement for a reassemble buffer of a receiver is reduced. Therefore packet loss is prevented when a reassemble buffer of the receiving side is insufficient in a data transmission process, and a technical effect of effectively preventing packet loss is achieved.

Figure 3:
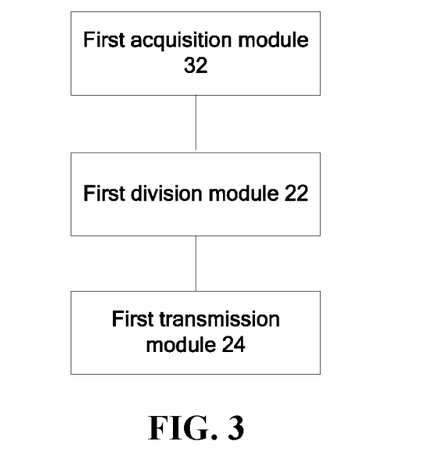
FIG. 3 is a structural block diagram 2 of a data transmission device according to an embodiment of the present application.

FIG. 3 is a structural block diagram 2 of a data transmission device according to an embodiment of the present application. As shown in FIG. 3, the device further includes a first acquisition module 32 in addition to the device shown in FIG. 2.

The first acquisition module 32 is configured to acquire the maximum number of fragmentable data streams according to a reassembly buffer size of the data transmission device itself, where the number of logical link groups does not exceed the number of fragmentable data streams.

Exemplarily, the first acquisition module 32 may be configured to acquire the maximum number of fragmentable data streams in a following manner: the maximum number of fragmentable data streams=the reassembly buffer size/the maximum frame length supported by each logic link.

The reassembly buffer size satisfies at least one of: the maximum number of ONUs supported by a passive optical network system; or fragmentable data streams supported by each ONU, where the number of fragmentable data streams supported by each ONU is one or more.

In an exemplary embodiment, the first division module 22 may be configured to divide the logical links supported by the ONU into at least one logical link group based on at least one of: a weight of each of the logical links, a priority of each of the logical links, a service carried by each of the logical links, or a user to which each of the logical links belongs.

Exemplarily, after one or more logical links within each of the at least one logical link group of the ONU transmit the data, a data stream including at least one of a data frame or data frame fragments is formed. When the data stream includes the data frame fragments, no other data frame or no other data frame fragment is included between data frame fragments belonging to the same data frame.

Exemplarily, one or more logical links within each of the at least one logical link group of the ONU share the bandwidth to transmit the data according to a scheduling algorithm. When a logical link is scheduled for transmitting data and the logical link is able to transmit a complete frame, data of a next frame is continuously transmitted; and when a logical link is scheduled for transmitting the data and the logical link is not able to transmit the complete frame, part of the data of the next frame is transmitted through the logical link and remaining part of the data of the next frame is transmitted in a next bandwidth. When the next bandwidth is acquired by the logical link group of the ONU, a logical link having remaining frame data within the logical link group of the ONU preferentially transmits the remaining frame data.

Exemplarily, the ONU serializes to-be-transmitted data frames of the one or more logical links within the logical link group into a data frame queue according to a scheduling algorithm. After an uplink bandwidth is acquired by the logical link group of the ONU, a to-be-transmitted data frame is acquired from the data frame queue, the to-be-transmitted data frame is divided into multiple quanta, and a corresponding quantum is transmitted according to a size of the uplink bandwidth until the uplink bandwidth is exhausted or no to-be-transmitted data frame exists.

The scheduling algorithm may include at least one of: fair scheduling, priority scheduling, weight scheduling or buffer scheduling.

In an exemplary embodiment, the bandwidth may be acquired in at least one of following manners: one or more logic links within the logical link group applies for a bandwidth respectively, and the OLT allocates the bandwidth to the logical link group according to a sum of bandwidths applied by one or more logic links within the logical link group; or the logical link group sums up bandwidth requirements of one or more logical links within the group to implement a uniform application, and the OLT allocates the bandwidth to the logical link group according to the uniform application.

Exemplarily, the device may further include a module configured to reserve at least one fragmentable data stream or logical link group for an unregistered ONU.

It should be noted that the above modules may be implemented by software or hardware. Implementation by hardware may, and may not necessarily, be implemented by a same processor or by different processors.

Figure 4:
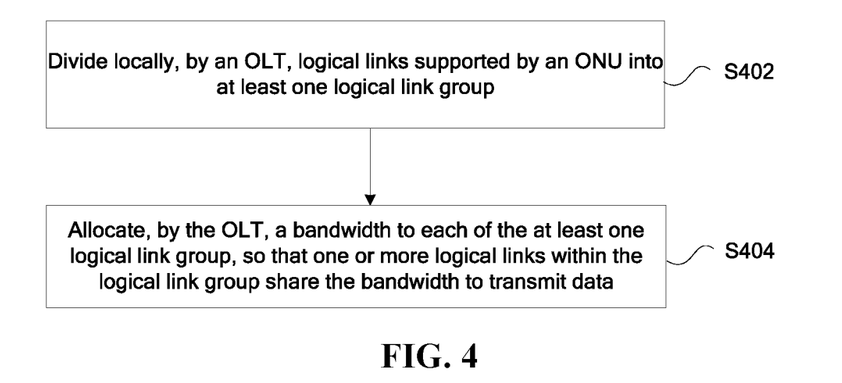
FIG. 4 is a flowchart of another data transmission method according to an embodiment of the present application.

FIG. 4 is a flowchart of another data transmission method according to an embodiment of the present application. As shown in FIG. 4, the data transmission method of the present embodiment includes steps described below.

In step S402, an OLT locally divides logical links supported by an ONU into at least one logical link group.

In step S404, the OLT allocates a bandwidth to each of the at least one logical link group, so that one or more logical links within each of the at least one logical link group share the bandwidth to transmit data.

Exemplarily, the execution order of step S402 and step S404 may be interchanged, that is, step S404 may be implemented first, and then step S402 is implemented.

Exemplarily, the application scenario of the above data transmission method includes, but is not limited to an application scenario described below. An OLT divides logical links supported by the ONU into at least one logical link group. The OLT allocates a bandwidth to each of the at least one logical link group, so that one or more logical links within each of the at least one logical link group share the bandwidth to transmit data. That is to say, logical links of a transmitter are grouped so that multiple logical links are grouped into a logical link group, and thus the number of fragmentable links can be effectively reduced, and the requirement for a reassemble buffer of a receiver is reduced. Therefore packet loss is prevented when a reassemble buffer of the receiving side is insufficient in a data transmission process, and a technical effect of effectively preventing packet loss is achieved.

In an exemplary embodiment, the OLT acquires the maximum number of fragmentable data streams of the ONU according to a reassembly buffer size of the OLT, where the number of logical link groups divided by the OLT does not exceed the maximum number of fragmentable data streams of the ONU.

Exemplarily, the maximum number of fragmentable data streams may be acquired in a following manner: the maximum number of fragmentable data streams=a reassembly buffer size/a maximum frame length supported by each logic link.

The reassembly buffer size of the ONU is actively reported to the OLT by the ONU; or the reassembly buffer size of the ONU is reported to the OLT in response to a request of the OLT.

In an exemplary embodiment, when the OLT does not acquire the reassembly buffer size of the ONU, the logical links supported by the ONU are divided into a logical link group.

Exemplarily, the logical links supported by the ONU may be divided into at least one logical link group based on at least one of: a weight of each of the logical links, a priority of each of the logical links, a service carried by each of the logical links, or a user to which each of the logical links belongs.

Exemplarily, after one or more logical links within each of the at least one logical link group of the OLT transmit the data, a data stream including at least one of a data frame or data frame fragments is formed. When the data stream includes the data frame fragments, no other data frame or no other data frame fragment is included between data frame fragments belonging to the same data frame.

Exemplarily, one or more logical links within the logical link group of the OLT share the bandwidth to transmit the data according to a scheduling algorithm. When a logical link is scheduled for transmitting data and the logical link is able to transmit a complete frame, data of a next frame is continuously transmitted; and when a logical link is scheduled for transmitting the data and the logical link is not able to transmit the complete frame, part of the data of the next frame is transmitted through the logical link and remaining part of the data of the next frame is transmitted in a next bandwidth. When the next bandwidth is acquired by the logical link group of the ONU, a logical link having remaining frame data within the logical link group of the ONU preferentially transmits the remaining frame data.

In an exemplary embodiment, the OLT serializes to-be-transmitted data frames of one or more logical links within the logical link group into a data frame queue according to a scheduling algorithm. After an uplink bandwidth is acquired by the logical link group of the OLT, a to-be-transmitted data frame is acquired from the data frame queue, the to-be-transmitted data frame is divided into multiple quanta, and a corresponding quantum is transmitted according to a size of the uplink bandwidth until the uplink bandwidth is exhausted or no to-be-transmitted data frame exists.

In an exemplary embodiment, the scheduling algorithm may include at least one of: fair scheduling, priority scheduling, weight scheduling or buffer scheduling.

The embodiment will be described below in conjunction with the example.

An OLT determines the number of fragmentable data streams according to a reassembly buffer capability of an ONU. By default, the OLT considers that the ONU only supports one fragmentable data stream, and all logic links of one ONU belong to one fragmentable data stream. When the OLT acquires reassembly buffer or related information (e.g., the number of fragmentable data streams) of the ONU, the OLT may set a corresponding number of fragmentable data streams for the ONU and readjust the logical links of the ONU into the corresponding fragmentable data streams.

Figure 5:
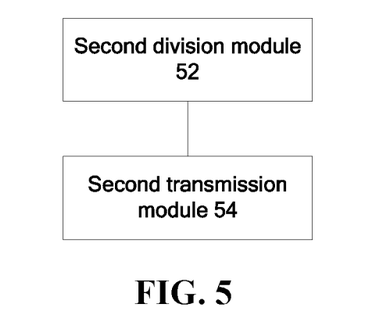
FIG. 5 is a structural block diagram 1 of another data transmission device according to an embodiment of the present application.

FIG. 5 is a structural block diagram 1 of another data transmission device according to an embodiment of the present application. As shown in FIG. 5, the device includes a second division module 52 and a second transmission module 54.

The second division module 52 is configured to locally divide logical links supported by an ONU into at least one logical link group.

The second transmission module 54 is configured to allocate a bandwidth to each of the at least one logical link group, so that one or more logical links within each of the at least one logical link group share the bandwidth to transmit data.

Exemplarily, the application scenario of the above data transmission method includes, but is not limited to a passive optical network system. In this application scenario, the OLT divides logical links supported by the ONU into at least one logical link group; and the OLT allocates a bandwidth to each of the at least one logical link group, so that one or more logical links within each of the at least one logical link group share the bandwidth to transmit data. That is to say, logical links of a transmitter are grouped so that multiple logical links are grouped into a logical link group, and thus the number of fragmentable links can be effectively reduced, and the requirement for a reassemble buffer of a receiver is reduced. Therefore packet loss is prevented when a reassemble buffer of the receiving side is insufficient in a data transmission process, and a technical effect of effectively preventing packet loss is achieved.

Figure 6:
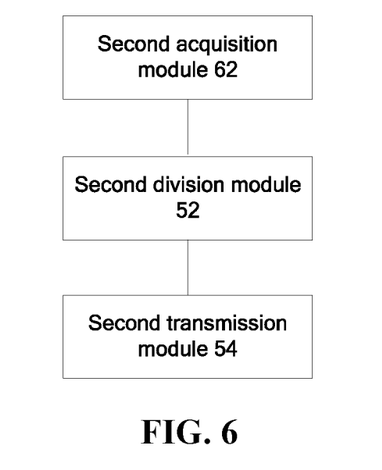
FIG. 6 is a structural block diagram 2 of another data transmission device according to an embodiment of the present application.

FIG. 6 is a structural block diagram 2 of another data transmission device according to an embodiment of the present application. As shown in FIG. 6, the device further includes a second acquisition module 62 in addition to the modules shown in FIG. 5.

The second acquisition module 62 is configured to acquire the maximum number of fragmentable data streams of the ONU according to a reassembly buffer size of the ONU, where the number of logical link groups of the ONU does not exceed the maximum number of fragmentable data streams of the ONU.

In an exemplary embodiment, the second acquisition module 62 may be configured to acquire the maximum number of fragmentable data streams in a following manner: the maximum number of fragmentable data streams=the reassembly buffer size/the maximum frame length supported by each logic link.

Exemplarily, the reassembly buffer size of the ONU is actively reported to the OLT by the ONU; or the reassembly buffer size of the ONU is reported to the OLT in response to a request of the OLT.

Figure 7:
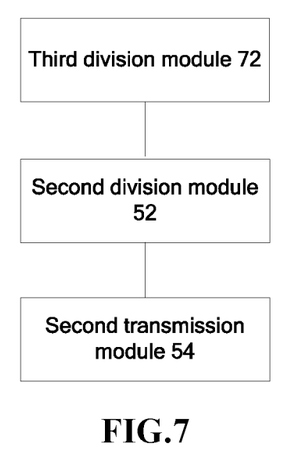
FIG. 7 is a structural block diagram 3 of another data transmission device according to an embodiment of the present application.

FIG. 7 is a structural block diagram 3 of another data transmission device according to an embodiment of the present application. As shown in FIG. 7, the device further includes a third division module 72 in addition to the modules shown in FIG. 5.

The third division module 72 is configured to divide the logical links supported by the ONU into a logical link group when the OLT does not acquire a reassembly buffer size of the ONU.

Exemplarily, the second division module 72 may be configured to divide the logical links supported by the ONU into at least one logical link group based on at least one of: a weight of each of the logical links, a priority of each of the logical links, a service carried by each of the logical links, or a user to which each of the logical links belongs.

Exemplarily, after one or more logical links within each of the at least one logical link group of the OLT transmit the data, a data stream including at least one of a data frame or data frame fragments is formed. When the data stream includes the data frame fragments, no other data frame or no other data frame fragment is included between data frame fragments belonging to the same data frame.

Exemplarily, one or more logical links within the logical link group of the OLT share the bandwidth to transmit the data according to a scheduling algorithm. When a logical link is scheduled for transmitting data and the logical link is able to transmit a complete frame, data of a next frame is continuously transmitted; and when a logical link is scheduled for transmitting the data and the logical link is not able to transmit the complete frame, part of the data of the next frame is transmitted through the logical link and remaining part of the data of the next frame is transmitted in a next bandwidth. When the next bandwidth is acquired by the logical link group of the ONU, a logical link having remaining frame data within the logical link group of the ONU preferentially transmits the remaining frame data.

In an exemplary embodiment, the OLT serializes to-be-transmitted data frames of one or more logical links within the logical link group into a data frame queue according to a scheduling algorithm. After an uplink bandwidth is acquired by the logical link group of the OLT, a to-be-transmitted data frame is acquired from the data frame queue, the to-be-transmitted data frame is divided into multiple quanta, and a corresponding quantum is transmitted according to a size of the uplink bandwidth until the uplink bandwidth is exhausted or no to-be-transmitted data frame exists.

Exemplarily, the scheduling algorithm may include at least one of: fair scheduling, priority scheduling, weight scheduling or buffer scheduling.

It should be noted that the above modules may be implemented by software or hardware. Implementation by hardware may, and may not necessarily, be implemented by a same processor or by different processors.

An embodiment of the present application further provides a storage medium. In the embodiment, the storage medium may be configured to store program codes for executing the steps described below.

In S1, an OLT divides logical links supported by an ONU into at least one logical link group.

In S2, the OLT allocates a bandwidth to each of the at least one logical link group of the ONU, so that one or more logical links within each of the at least one logical link group of the ONU share the bandwidth to transmit data.

Exemplarily, the storage medium may further be configured to store program codes for executing the steps described below.

In S3, an OLT locally divides logical links supported by an ONU into at least one logical link group.

In S4, the OLT allocates a bandwidth to each of the at least one logical link group, so that one or more logical links within each of the at least one logical link group share the bandwidth to transmit data.

In the embodiment, the storage medium may include, but is not limited to, a USB flash disk, a read-only memory (ROM), a random access memory (RAM), a mobile hard disk, a magnetic disk, an optical disk or another medium capable of storing the program codes.

In the embodiment, the processor may execute the above steps S1 and S2 according to the program codes stored in the storage medium.

In the embodiment, the processor may execute the above steps S3 and S4 according to the program codes stored in the storage medium.

For examples in the embodiment, reference may be made to the examples described in the above embodiments and exemplary embodiments, and the examples will not be repeated in the embodiment.

It should be understood by those skilled in the art that functional modules/units in all or part of the steps of the method, the system and the device disclosed above may be implemented as software, firmware, hardware and appropriate combinations thereof. In the hardware implementation, the division of the functional modules/units mentioned in the above description may not correspond to the division of physical components. For example, one physical component may have several functions, or one function or step may be implemented jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium and a communication medium (or a transitory medium). As is known to those skilled in the art, the term, computer storage medium, includes volatile and nonvolatile, removable and non-removable media implemented in any method or technology for storing information (such as computer-readable instructions, data structures, program modules or other data). The computer storage medium includes, but is not limited to, a RAM, a ROM, an electrically erasable programmable read-only memory (EEPROM), a flash memory or other memory technologies, a compact disc-read only memory (CD-ROM), a digital versatile disc (DVD) or other optical disc storage, a magnetic cassette, a magnetic tape, a magnetic disk storage or other magnetic storage devices, or any other media used for storing desired information and accessed by a computer. In addition, as is known to those skilled in the art, the communication medium generally includes computer-readable instructions, data structures, program modules or other data in modulated data signals such as carriers or other transmission mechanisms, and may include any information delivery medium.

The above are merely exemplary embodiments of the present application and are not intended to limit the present application, and for those skilled in the art, the present application may have various modifications and variations. Any modifications, equivalent substitutions, improvements and the like made within the spirit and principle of the present application should fall within the scope of the present application.

INDUSTRIAL APPLICABILITY

Embodiments of the present application provide a data transmission method and device capable of effectively preventing packet loss.

What is claimed is:
1. A data transmission method, comprising:
dividing (S102), by an optical line terminal, OLT, logical links supported by an optical network unit, ONU, into at least one logical link group having a group link identifier, GLID; and
allocating (S104), by the OLT, a bandwidth to the GLID of each of the at least one logical link group of the ONU, so that a plurality of logical links within each of the at least one logical link group of the ONU share the bandwidth to transmit data, wherein a shared bandwidth of each logical link within each of the at least one logical link group is determined by the ONU;

wherein after the plurality of logical links within each of the at least one logical link group of the ONU transmit the data, a data stream comprising data frame fragments is formed, and no other data frame or no other data frame fragment is comprised between data frame fragments belonging to a same data frame.

2. The method of claim 1, further comprising: acquiring, by the OLT, a maximum number of fragmentable data streams according to a reassembly buffer size of the OLT, wherein a total number of the at least one logical link group does not exceed the number of the fragmentable data streams.

3. The method of claim 2, wherein the maximum number of fragmentable data streams is acquired in a following manner:
the maximum number of fragmentable data streams=the reassembly buffer size/a maximum frame length supported by each of the plurality of logic links.

4. The method of claim 2, wherein the reassembly buffer size satisfies at least one of:
a maximum number of ONUs supported by a passive optical network system; or
fragmentable data streams supported by each ONU, wherein the number of fragmentable data streams supported by each ONU is one or more.

5. The method of claim 1, wherein the logical links supported by the ONU are divided into at least one logical link group based on at least one of: a weight of each of the logical links, a priority of each of the logical links, a service carried by each of the logical links, or a user to which each of the logical links belongs.

6. The method of claim 1, wherein the bandwidth is acquired in at least one of following manners:
each of the plurality of logic links within each of the at least one logical link group applies for a bandwidth, and the OLT allocates the bandwidth to each of the at least one logical link group according to a sum of bandwidths applied by the plurality of logic links within each of the at least one logical link group; or
each of the at least one logical link group sums up bandwidth requirements of the plurality of logical links within the group to file a uniform application, and the OLT allocates the bandwidth to each of the at least one logical link group according to the uniform application.

7. The method of claim 1, further comprising: reserving, by the OLT, at least one fragmentable data stream or logical link group for an unregistered ONU.

8. The method of claim 1, wherein a plurality of logical links within each of the at least one logical link group of the ONU share the bandwidth to transmit the data according to a scheduling algorithm;
in a case where a logical link is scheduled for transmitting the data and the logical link is not able to transmit the complete data frame, part of the data of the next frame is transmitted through the logical link and remaining part of the data of the next frame is transmitted in a next bandwidth; and
in a case where the next bandwidth is acquired by each of the at least one logical link group of the ONU, a logical link having remaining frame data within each of the at least one logical link group of the ONU transmits the remaining frame data before each logical link within the same logical link group as the logical link having remaining frame data transmits other data.

9. A data transmission method, comprising:
locally dividing (S402), by an optical line terminal, OLT, logical links supported by an optical network unit, ONU, into at least one logical link group having a group link identifier, GLID; and
allocating (S404), by the OLT, a bandwidth to the GLID of each of the at least one logical link group, so that a plurality of logical links within each of the at least one logical link group share the bandwidth to transmit data,
wherein a shared bandwidth of each logical link within each of the at least one logical link group is determined by the ONU;
wherein after the plurality of logical links within each of the at least one logical link group of the OLT transmit the data, a data stream comprising data frame fragments is formed, and no other data frame or no other data frame fragment is comprised between data frame fragments belonging to a same data frame.

10. The method of claim 9, further comprising: acquiring, by the OLT, a maximum number of fragmentable data streams of the ONU according to a reassembly buffer size of the ONU, wherein a total number of the at least one logical link group of the ONU divided by the OLT does not exceed the maximum number of fragmentable data streams of the ONU.

11. The method of claim 10, wherein the maximum number of fragmentable data streams is acquired in a following manner:
the maximum number of fragmentable data streams=the reassembly buffer size/a maximum frame length supported by each of the plurality of logical links.

12. The method of claim 10, wherein the reassembly buffer size of the ONU is actively reported to the OLT by the ONU; or the reassembly buffer size of the ONU is reported to the OLT in response to a request of the OLT.

13. The method of claim 9, wherein in a case where the OLT does not acquire a reassembly buffer size of the ONU, the logical links supported by the ONU are divided into a logical link group.

14. The method of claim 9, wherein the logical links supported by the ONU are divided into at least one logical link group based on at least one of: a weight of each of the logical links, a priority of each of the logical links, a service carried by each of the logical links, or a user to which each of the logical links belongs.

15. The method of claim 9, wherein the plurality of logical links within each of the at least one logical link group of the OLT share the bandwidth to transmit data according to a scheduling algorithm;
wherein in a case where a logical link is scheduled for transmitting data and the logical link is able to transmit a complete frame, data of a next frame is continuously transmitted; and
in a case where a logical link is scheduled for transmitting the data and where the logical link is not able to transmit the complete frame, part of the data of the next frame is transmitted through the logical link and remaining part of the data of the next frame is transmitted in a next bandwidth.

16. The method of claim 15, wherein in a case where the next bandwidth is acquired by each of the at least one logical link group of the OLT, a logical link having remaining frame data within each of the at least one logical link group of the OLT transmits the remaining frame data before each logical link within the same logical link group as the logical link having remaining frame data transmits other data.

17. A data transmission device, applied to an optical line terminal, OLT, and comprising a processor and a storage device for storing computer executable instructions that when executed by the processor cause the processor to perform the following to implement the method according to claim 9:
- locally dividing logical links supported by an optical network unit, ONU, into at least one logical link group having a group link identifier, GLID;
- allocating a bandwidth to the GLID of each of the at least one logical link group, so that a plurality of logical links within each of the at least one logical link group share the bandwidth to transmit data;
- acquiring a maximum number of fragmentable data streams of the ONU according to a reassembly size of the O buffer NU, wherein a total number of the at least one logical link group of the ONU does not exceed the maximum number of fragmentable data streams of the ONU; and
- dividing the logical links supported by the ONU into a logical link group in a case where the OLT does not acquire a reassembly buffer size of the ONU,
- wherein a shared bandwidth of each logical link within each of the at least one logical link group is determined by the ONU;
- wherein after the plurality of logical links within each of the at least one logical link group of the OLT transmit the data, a data stream comprising data frame fragments is formed, and no other data frame or no other data frame fragment is comprised between data frame fragments belonging to a same data frame.

18. A data transmission device, applied to an optical line terminal, OLT, and comprising a processor and a storage device for storing computer executable instructions that when executed by the processor cause the processor to:
- divide logical links supported by an optical network unit, ONU, into at least one logical link group having a group link identifier, GLID;
- allocate a bandwidth to the GLID of each of the at least one logical link group of the ONU, so that a plurality of logical links within each of the at least one logical link group of the ONU share the bandwidth to transmit data; and
- acquire a maximum number of fragmentable data streams according to a reassembly buffer size of the OLT, wherein a total number of the at least one logical link group does not exceed the number of fragmentable data streams,
- wherein a shared bandwidth of each logical link within each of the at least one logical link group is determined by the ONU;
- wherein after the plurality of logical links within each of the at least one logical link group of the ONU transmit the data, a data stream comprising data frame fragments is formed, and no other data frame or no other data frame fragment is comprised between data frame fragments belonging to a same data frame.

\* \* \* \* \*